United States Patent
Zhu (10) Patent No.: US 10,604,705 B2
(45) Date of Patent: Mar. 31, 2020

(54) MATERIAL HEATING DEVICE

(71) Applicant: Shuhong Zhu, Henan (CN)

(72) Inventor: Shuhong Zhu, Henan (CN)

( * ) Notice: Subject to any disclaimer, the term of this patent is extended or adjusted under 35 U.S.C. 154(b) by 0 days.

(21) Appl. No.: 16/185,424

(22) Filed: Nov. 9, 2018

(65) Prior Publication Data

US 2019/0093017 A1    Mar. 28, 2019

Related U.S. Application Data

(63) Continuation-in-part of application No. PCT/CN2017/085425, filed on May 23, 2017.

(30) Foreign Application Priority Data

Dec. 12, 2016    (CN) .......................... 2016 1 1138459

(51) Int. Cl.
*C10B 5/10*    (2006.01)
*F27B 7/36*    (2006.01)
(Continued)

(52) U.S. Cl.
CPC ................ *C10B 5/10* (2013.01); *C10B 27/06* (2013.01); *C10B 41/00* (2013.01); *C10B 47/30* (2013.01);
(Continued)

(58) Field of Classification Search
CPC ........... C10B 5/10; C10B 53/02; C10B 53/04; C10B 47/30; C10B 27/06; C10B 57/14;
(Continued)

(56) References Cited

U.S. PATENT DOCUMENTS 3,290,029 A * 12/1966 Niemitz .................. F27B 7/224
432/4
3,521,866 A * 7/1970 Knappstein ............... C10B 1/10
165/179
(Continued)

FOREIGN PATENT DOCUMENTS

CA    2907624    *    9/2014    ............. C10B 49/16
CN    203454867 U    *    2/2014    ............. F28D 7/16
(Continued)

OTHER PUBLICATIONS

General Catalogue C008B—Technical Data—Mitsubishi Carbide. Tokyo: Mitsubishi Materials. Accessed Jul. 31, 2019 at http://www.mitsubishicarbide.com/application/files/6915/1668/5748/catalog_c008b_technical_data.pdf (Year: 2005).*

(Continued)

*Primary Examiner* — Youngsul Jeong
*Assistant Examiner* — Gabriel E Gitman
(74) *Attorney, Agent, or Firm* — Berggren LLP (57) ABSTRACT

A material heating device comprises a rotary kiln, a plurality of heat exchange tubes, a hot air hood, a high-temperature gas input mechanism, an exhaust-gas collecting chamber, and an exhaust-gas output pipeline. The rotary kiln is provided with a material feed end and a material discharge end. The heat exchange tubes are in the rotary kiln. The hot air hood is outside the rotary kiln. The air inlet ends of the heat exchange tubes communicate with the hot air hood, and the air outlet ends of the heat exchange tubes communicate with the exhaust-gas collecting chamber. The exhaust-gas collecting chamber communicates with the exhaust-gas output pipeline. The hot air hood communicates with the high-temperature gas input mechanism, and the cavity between the heat exchange tubes and the heat insulation (Continued)

layer of the rotary kiln is a material channel. The heat exchange tubes are directly in contact with the material.

18 Claims, 3 Drawing Sheets

(51) Int. Cl.
    *F27B 7/14*     (2006.01)
    *F27B 7/20*     (2006.01)
    *F27B 7/34*     (2006.01)
    *C10B 57/14*     (2006.01)
    *F27B 7/42*     (2006.01)
    *C10B 27/06*     (2006.01)
    *C10B 41/00*     (2006.01)
    *C10B 47/30*     (2006.01)
    *C10B 53/02*     (2006.01)
    *C10B 53/04*     (2006.01)

(52) U.S. Cl.
    CPC .............. *C10B 53/02* (2013.01); *C10B 53/04* (2013.01); *C10B 57/14* (2013.01); *F27B 7/14* (2013.01); *F27B 7/2016* (2013.01); *F27B 7/34* (2013.01); *F27B 7/36* (2013.01); *F27B 7/42* (2013.01); *F27B 2007/365* (2013.01); *Y02E 50/14* (2013.01)

(58) Field of Classification Search
    CPC .... C10B 41/00; F27B 7/14; F27B 7/34; F27B 7/36; F27B 7/42; F27B 7/2016; F27B 2007/365; Y02E 50/14
    See application file for complete search history.

(56) References Cited

U.S. PATENT DOCUMENTS

| | | | | |
|---|---|---|---|---|
| 4,507,174 A | * | 3/1985 | Kutrieb | C09C 1/482 201/25 |
| 4,797,091 A | * | 1/1989 | Neumann | C04B 7/4446 110/220 |
| 5,095,040 A | * | 3/1992 | Ledford | C10B 47/30 201/15 |
| 5,716,205 A | * | 2/1998 | Tratz | C10B 47/30 432/103 |
| 5,997,288 A | * | 12/1999 | Adams | C10B 1/10 110/226 |
| 9,127,227 B2 | * | 9/2015 | Brock | C10L 5/44 |
| 2003/0155108 A1 | * | 8/2003 | Shinohara | B60K 6/48 165/146 |
| 2008/0229610 A1 | * | 9/2008 | Ronning | F26B 11/0413 34/514 |
| 2013/0256113 A1 | * | 10/2013 | Tumiatti | B60K 6/48 165/146 |
| 2014/0332362 A1 | * | 11/2014 | Zhang | C10B 47/30 202/118 |

FOREIGN PATENT DOCUMENTS

| | | | | |
|---|---|---|---|---|
| CN | 104789241 A | * | 7/2015 | ............ C10B 47/30 |
| CN | 104877695 A | * | 9/2015 | ............ C10B 47/30 |
| CN | 104877695 A | | 9/2015 | |
| CN | 104910939 A | * | 9/2015 | ............ C10B 15/00 |
| CN | 104910939 A | | 9/2015 | |
| CN | 105698534 A | | 6/2016 | |
| CN | 104789241 A | | 7/2016 | |
| WO | 9506697 A1 | | 3/1995 | |

OTHER PUBLICATIONS

CN104910939A_ENG (Espacenet machine translation of Xu) (Year: 2015).*
CN104789241A_ENG (Espacenet machine translation of Zhao) (Year: 2015).*
CN104877695A_ENG (Espacenet machine translation of Xie) (Year: 2015).*
CN203454867U_ENG (Espacenet machine translation of Jia) (Year: 2014).*
International Search Report.
First Office Action of priority document CN201611138459.
Second Office Action of priority document CN201611138459.
First search of priority document CN201611138459.
Written Opinion of the International Search Authority.

* cited by examiner

MATERIAL HEATING DEVICE

CROSS-REFERENCE TO RELATED APPLICATIONS

The present application is a continuation-in-part application based on PCT Application No. PCT/CN2017/085425, filed on May 23, 2017 and entitled "Material Heating Device", which claims priority to the Chinese patent application No. 201611138459.3, filed with the Chinese Patent Office on Dec. 12, 2016 and entitled "Material Heating Device", the contents of which are incorporated herein by reference in their entirety.

TECHNICAL FIELD

The present disclosure relates to the technical field of rotary kiln heating devices, and particularly to a material heating device (a device for heating a material) related to coal or biomass pyrolysis.

BACKGROUND ART

In the technical field of coal pyrolysis, the medium-low temperature destructive distillation of coal generally employs an internal-heating shaft furnace. Internal-heating shaft furnaces are widely used because of its simple structure and low cost. However, the greatest disadvantage of the internal-heating shaft furnaces is that coal gas is mixed with the flame gas, wherein the coal gas has a low heat value, except the use of part of the coal gas for pyrolysis itself, most of the coal gas, if not being used in a lime kiln or power generation for co-production, will only be combusted and then emitted into the air, which not only causes energy waste, but also causes great environmental pollution problems. Relatively, fewer external-heating furnaces are used. Additionally, a common weakness in the prior art is that the combustion mechanism or the heating mechanism is disposed in the kiln body. This weakness is reflected in the following aspects, i.e., the combustion condition can hardly be observed, the combustion mechanism is difficult to repair and maintain, and it is difficult to use pulverized coal as the combustion medium, otherwise, the heat dissipation pipelines will be blocked easily.

SUMMARY

In order to solve at least one of the above problems, the present disclosure provides a material heating device, comprising a rotary kiln, a plurality of heat exchange tubes, a hot air hood, a high-temperature gas input mechanism, an exhaust gas collecting chamber and an exhaust gas output pipeline, wherein the rotary kiln is provided with a material feed end and a material discharge end, the plurality of heat exchange tubes are provided in the rotary kiln, uniformly distributed in the circumferential direction of the rotary kiln and adjacent to an inner wall of the rotary kiln, heat exchange tube brackets for supporting the heat exchange tubes are provided on the inner wall of the rotary kiln, a heat insulation layer is provided on a wall of the rotary kiln, the space between the heat exchange tubes and the rotary kiln is used as a material channel, the hot air hood is provided at the periphery of a rotary kiln housing, an air inlet end of each heat exchange tube is in communication with the hot air hood, each heat exchange tube is connected with the hot air hood through an elbow, with the elbow being a part of the each heat exchange tube, an air inlet elbow end of each heat exchange tube is connected with the rotary kiln housing, the hot air hood and the rotary kiln housing form, in combination, a hot air distribution chamber, an air outlet end of each heat exchange tube is in communication with the exhaust gas collecting chamber that is in communication with the exhaust gas output pipeline, the exhaust gas collecting chamber is provided at the material feed end of the rotary kiln, the hot air hood is in communication with the high-temperature gas input mechanism, and a sealing mechanism is provided at an outer side of a portion of the hot air hood where the hot air hood is connected with the rotary kiln housing.

The hot air hood is located in the middle of the rotary kiln and close to the material feed end. Some of the plurality of heat exchange tubes are arranged in a path directly from the hot air hood to the material feed end of the rotary kiln, and the rest of the plurality of heat exchange tubes are arranged in a path which goes firstly towards the material discharge end and then turns 180 degrees to go towards the material feed end.

BRIEF DESCRIPTION OF DRAWINGS

In order to make the technical solutions of embodiments of the present disclosure or of the prior art clearer, the drawings to be used in the embodiments or the prior art are briefly described. Apparently, the drawings described below are illustrative of some embodiments of the present disclosure, and a person skilled in the art may obtain other drawings based on the drawings below without using any inventive efforts.

Reference signs: 1—rotary kiln; 2—heat exchange tube; 3—hot air hood; 4—high-temperature gas input mechanism; 5—exhaust gas collecting chamber; 6—exhaust gas output pipeline; 7—material feed end; 8—material discharge end; 10—sealing mechanism; 11—heat-insulation ring; 12—air gap; 13—heat-insulating layer; 14—material temperature detection means; 15—heat-exchange-tube temperature detection means; 16—hot air distribution chamber; 17—heat exchange tube bracket; 18—elbow; 19—air outlet end; 20—inner wall of rotary kiln; 21—through hole.

DETAILED DESCRIPTION OF EMBODIMENTS

In order to make the objects, technical solutions and advantages of embodiments of the present disclosure clearer, the technical solutions in the embodiments of the present disclosure will be clearly and completely described in conjunction with the drawings in the embodiments of the present disclosure. Apparently, the described embodiments are partial embodiments of the present disclosure, and not all of the embodiments. The components of the disclosed embodiments, which are generally described and illustrated in the figures herein, may be arranged and designed in various different configurations.

It should be noted that similar reference numerals and letters indicate similar items in the following figures, and therefore, once an item is defined in a drawing, it is not necessary to further define and explain it in the subsequent drawings.

In the description of the present disclosure, it should be further noted that unless otherwise specifically defined, the terms "provide", "install", "connected", and "connecting" are to be understood broadly, and for example, may be fixed connection, detachable connection, or integral connection, may be mechanical connection or an electrical connection; may be directly connected or indirectly connected through an intermediate medium, or may be internal communication between the two elements. The specific meanings of the above terms in the present disclosure can be understood in the specific circumstances by those skilled in the art.

Figure 1:
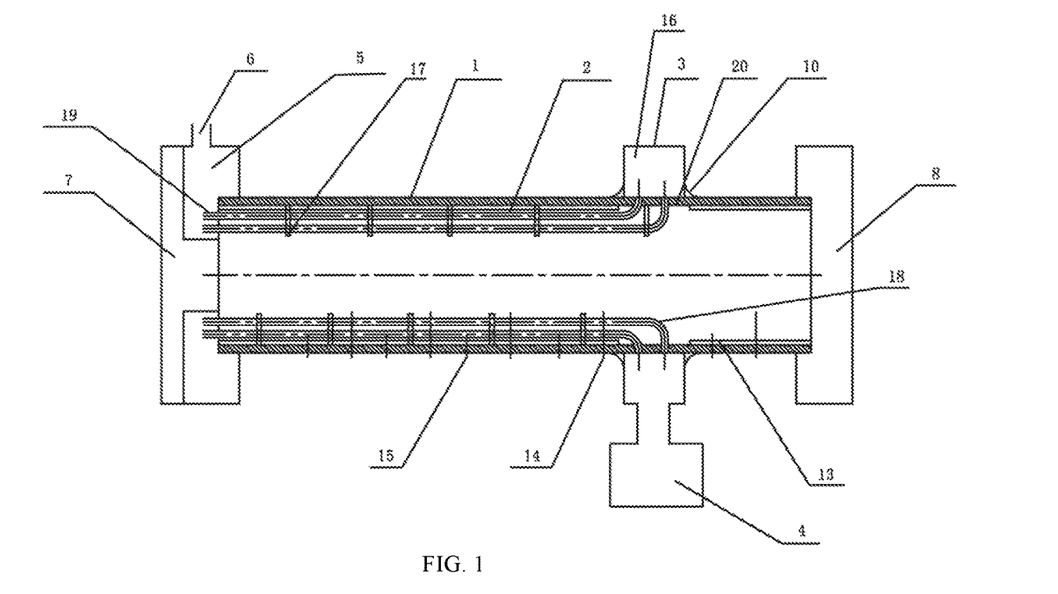
FIG. 1 is a structural schematic diagram of a material heating device of an embodiment of the present disclosure, in which the hot air hood and the rotary kiln housing form, in combination, a hot air distribution chamber and the heat exchange tubes are arranged in a path directly from the hot air hood to the material feed end of the rotary kiln.

FIG. 1 shows a material heating device, comprising a rotary kiln 1, a plurality of heat exchange tubes 2, a hot air hood 3, a high-temperature gas input mechanism 4, an exhaust gas collecting chamber 5 and an exhaust gas output pipeline 6. The rotary kiln is provided with a material feed end 7 and a material discharge end 8. The plurality of heat exchange tubes 2 are provided in the rotary kiln 1 and uniformly distributed in the circumferential direction, material channels are formed between the plurality of heat exchange tubes 2 and the inner cavity of the rotary kiln 1. The hot air hood 3 is provided at the periphery of a rotary kiln 1 housing (housing of the rotary kiln 1). An air inlet end of each of the plurality of heat exchange tube 2 is in communication with the hot air hood 3. Each heat exchange tube 2 is connected with the hot air hood 3 through an elbow 18, with the elbow being a part of the heat exchange tube 2. The hot air hood 3 and the rotary kiln 1 housing form, in combination, a hot air distribution chamber 16. An air inlet elbow end of each heat exchange tube 2 is connected with the rotary kiln 1 housing. An air outlet end 19 of each heat exchange tube 2 is in communication with the exhaust gas collecting chamber 5. The exhaust gas collecting chamber 5 is in communication with the exhaust gas output pipeline 6. The exhaust gas collecting chamber 5 is provided at the material feed end 7 of the rotary kiln 1. The hot air hood 3 is in communication with the high-temperature gas input mechanism 4. A sealing mechanism 10 is provided at an outer side of a portion of the hot air hood 3 where the hot air hood is connected with the rotary kiln 1 housing. Multiple independent heat exchange tube brackets 17 for supporting the heat exchange tube are provided on the inner wall 20 of the rotary kiln. A heat insulation layer 13 is provided on the inner surface of the rotary kiln 1 housing, wherein the heat insulation layer 13 is located between the inner wall 20 of the rotary kiln and the plurality of heat exchange tubes, and no heat insulation layer is provided at a local portion of the inner surface of the rotary kiln 1 housing where the air inlet elbow ends of the heat exchange tubes 2 are connected with the rotary kiln 1 housing, i.e. no heat insulation layer is provided at the surface of the portion of the inner wall 20 of the rotary kiln corresponding to the hot air hood.

The heat exchange tubes 2 are made of a heat-resistant steel, and preferably, the heat-resistant steel is OCr25Ni20.

A fireproof material is provided on an inner side of a hot air distribution chamber 16 formed by combination of the hot air hood 3 and the rotary kiln 1 housing.

The hot air hood 3 is located in the middle of the rotary kiln 1 and close to the material discharge end 8.

The heat exchange tubes 2 are arranged in a path directly from the hot air hood 3 to the material feed end 7 of the rotary kiln 1, and the hot air hood 3 is one in number.

The rotary kiln 1 is provided with a plurality of material temperature detection means 14, wherein through feedback of the plurality of material temperature detection means 14, combustion in the high-temperature gas input mechanism 4 can be controlled, thereby effectively controlling the temperature within the rotary kiln, such that it conforms to the temperature required by the process.

Figure 5:
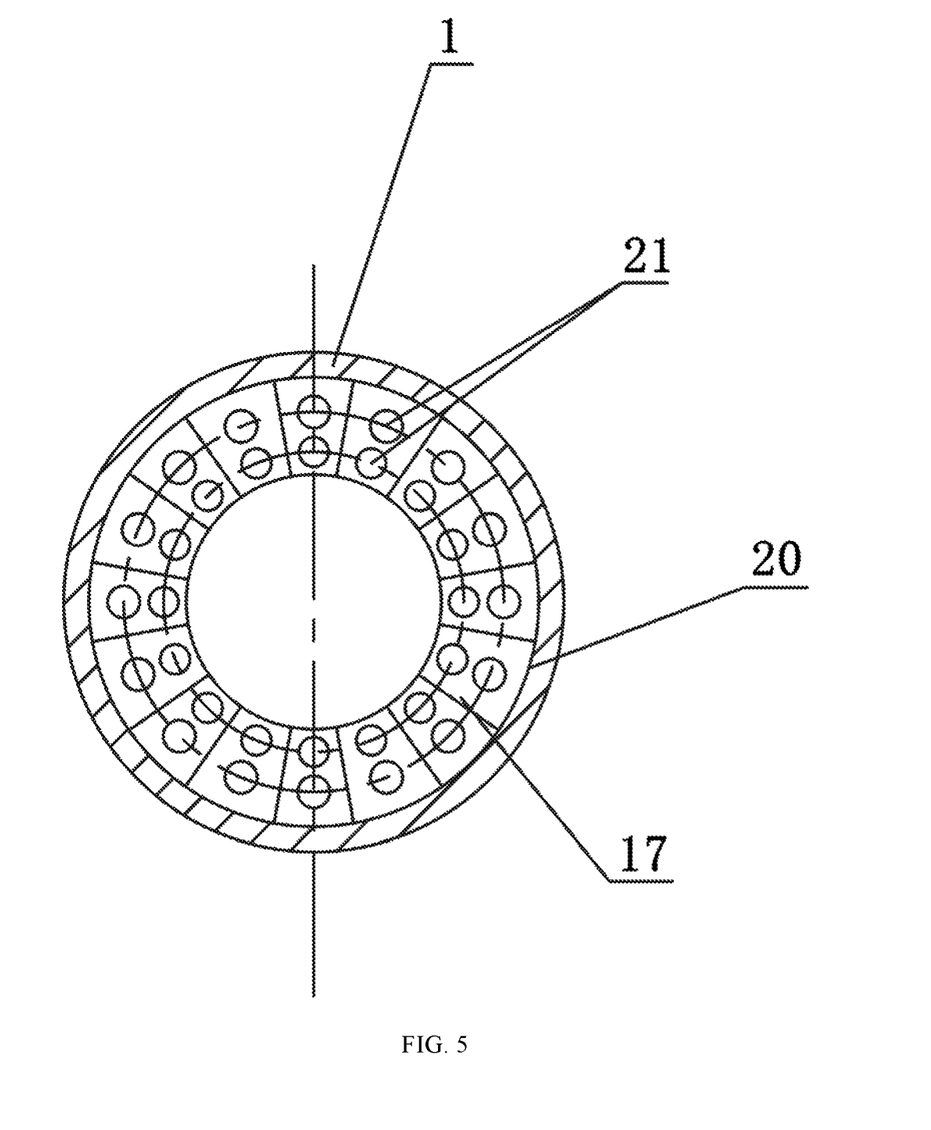
FIG. 5 is a cross-section view of another material heating device of an embodiment of the present disclosure, in which the heat exchange tube brackets are shown.

As shown in FIG. 5, the heat exchange tube brackets 17 for supporting the heat exchange tubes are provided with through holes 21. Each through hole 21 is used for allowing a respective heat exchange tube 2 to pass therethough, wherein each heat exchange tube 2 is in clearance fit with its corresponding through hole 21, with the clearance having a length of 2-5 mm in the diameter direction of the rotary kiln. The multiple heat exchange tube brackets 17 are provided in a staggered manner, i.e. the multiple heat exchange tube brackets 17 are not on the same plane when viewed from a section.

Embodiment II

Figure 2:
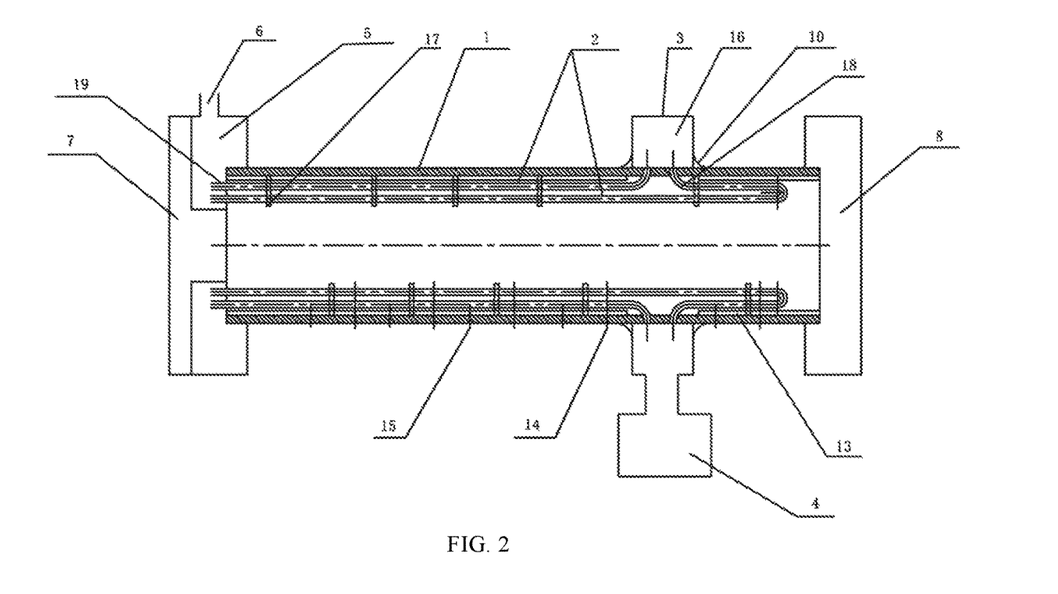
FIG. 2 is a structural schematic diagram of another material heating device of an embodiment of the present disclosure, in which the hot air hood and the rotary kiln housing form, in combination, a hot air distribution chamber, some of the heat exchange tubes are arranged in a direction directly from the hot air hood to the material feed end of the rotary kiln, and the other heat exchange tubes are arranged in a path which goes firstly towards the material discharge end and then turns 180 degrees to go towards the material feed end.

FIG. 2 shows a material heating device, comprising a rotary kiln 1, a plurality of heat exchange tubes 2, a hot air hood 3, a high-temperature gas input mechanism 4, an exhaust gas collecting chamber 5 and an exhaust gas output pipeline 6. The rotary kiln 1 is provided with a material feed end 7 and a material discharge end 8. The plurality of heat exchange tubes 2 are provided in the rotary kiln 1 and uniformly distributed in the circumferential direction, channels of materials under processing are between the plurality of heat exchange tubes 2 and the inner cavity of the rotary kiln 1. The hot air hood 3 is provided at the periphery of a rotary kiln 1 housing. An air inlet end of each of the plurality of heat exchange tube 2 is in communication with the hot air hood 3. Each heat exchange tube 2 is connected with the hot air hood 3 through an elbow 18, with the elbow being a part of the heat exchange tube 2. The hot air hood 3 and the rotary kiln 1 housing form, in combination, a hot air distribution chamber 16. An air inlet elbow end of each heat exchange tube 2 is connected with the rotary kiln 1 housing. An air outlet end 19 of each heat exchange tube 2 is in communication with the exhaust gas collecting chamber 5. The exhaust gas collecting chamber 5 is in communication with the exhaust gas output pipeline 6. The exhaust gas collecting chamber 5 is provided at the material feed end 7 of the rotary kiln 1. The hot air hood 3 is in communication with the high-temperature gas input mechanism 4. A sealing mechanism 10 is provided at an outer side of a portion of the hot air hood 3 where the hot air hood is connected with the rotary kiln 1 housing. Multiple independent heat exchange tube brackets 17 for supporting the heat exchange tube are provided on the inner wall 20 of the rotary kiln. A heat insulation layer 13 is provided on the inner surface of the rotary kiln 1 housing, wherein the heat insulation layer 13 is located between the inner wall 20 of the rotary kiln and the plurality of heat exchange tubes, and no heat insulation layer is provided at a local portion of the inner surface of the rotary kiln 1 housing where the air inlet elbow ends of the heat exchange tubes 2 are connected with the rotary kiln 1 housing, i.e. no heat insulation layer is provided at the surface of the portion of the inner wall 20 of the rotary kiln corresponding to the hot air hood.

The heat exchange tubes 2 are made of a heat-resistant steel, and preferably, the heat-resistant steel is OCr25Ni20.

A fireproof material is provided on an inner side of a hot air distribution chamber formed by combination of the hot air hood 3 and the rotary kiln 1 housing.

Some of the heat exchange tubes 2 are arranged in a path directly from the hot air hood 3 to the material feed end 7 of the rotary kiln 1, and the other heat exchange tubes 2 are arranged in a direction firstly towards the material discharge end 8 and then turns 180 degrees to go towards the material feed end 7.

The hot air hood 3 is one in number.

The rotary kiln 1 is provided with a plurality of material temperature detection means 14 and a plurality of heat-exchange-tube temperature detection means 15, wherein through feedback of the plurality of material temperature detection means 14 and the plurality of heat-exchange-tube temperature detection means 15, combustion in the high-temperature gas input mechanism and the rotational speed of the rotary kiln can be controlled, thereby effectively controlling the temperature within the rotary kiln, such that it conforms to the temperature required by the process.

As shown in FIG. 5, the heat exchange tube brackets 17 for supporting the heat exchange tubes are provided with through holes 21. Each through hole 21 is used for allowing a respective heat exchange tube 2 to pass therethough, wherein each heat exchange tube 2 is in clearance fit with its corresponding through hole 21, with the clearance having a length of 2-5 mm in the diameter direction of the rotary kiln. The multiple heat exchange tube brackets 17 are provided in a staggered manner, i.e. the multiple heat exchange tube brackets 17 are not on the same plane when viewed from a section.

Embodiment III

Figure 3:
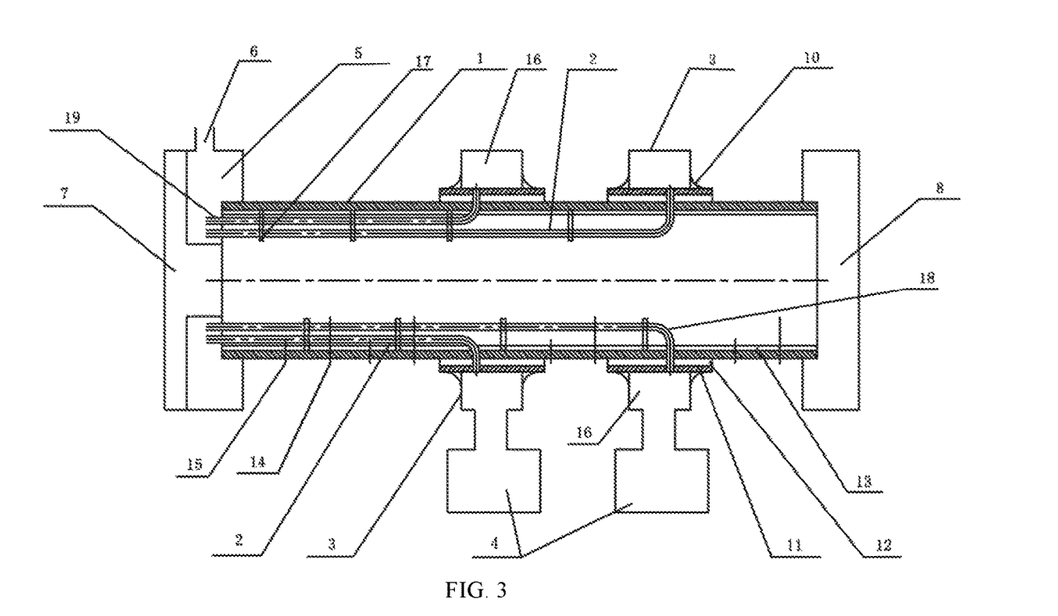
FIG. 3 is a structural schematic diagram of another material heating device of an embodiment of the present disclosure, in which the hot air hood and the heat insulation ring form, in combination, a hot air distribution chamber, the heat exchange tubes are arranged in a path directly from the hot air hood to the material feed end of the rotary kiln, and two hot air hoods preheat the rotary kiln by sections.

FIG. 3 shows a material heating device, comprising a rotary kiln 1, a plurality of heat exchange tubes 2, a hot air hood 3, a high-temperature gas input mechanism 4, an exhaust gas collecting chamber 5 and an exhaust gas output pipeline 6. The rotary kiln is provided with a material feed end 7 and a material discharge end 8. The plurality of heat exchange tubes 2 are provided in the rotary kiln 1 and uniformly distributed in the circumferential direction. Material heating channels are formed between the plurality of heat exchange tubes 2 and the inner cavity of the rotary kiln 1. The hot air hood 3 is provided at the periphery of a rotary kiln 1 housing. An air inlet end of each of the plurality of heat exchange tube 2 is in communication with the hot air hood 3. Each heat exchange tube 2 is connected with the hot air hood 3 through an elbow 18, with the elbow being a part of the heat exchange tube 2. An air outlet end 19 of each heat exchange tube 2 is in communication with the exhaust gas collecting chamber 5. The exhaust gas collecting chamber 5 is in communication with the exhaust gas output pipeline 6. The exhaust gas collecting chamber 5 is provided at the material feed end 7 of the rotary kiln 1. The hot air hood 3 is in communication with the high-temperature gas input mechanism 4. A sealing mechanism 10 is provided at an outer side of a portion of the hot air hood 3 where the hot air hood is connected with the rotary kiln 1 housing. Multiple independent heat exchange tube brackets 17 for supporting the heat exchange tube are provided on the inner wall 20 of the rotary kiln. A heat insulation layer 13 is provided on the inner surface of the rotary kiln 1 housing, wherein the heat insulation layer 13 is located between the inner wall 20 of the rotary kiln and the plurality of heat exchange tubes.

A heat insulation ring 11 is provided on the outer side of the rotary kiln 1 housing, a heat-insulating air gap 12 is provided between the heat insulation ring 11 and the rotary kiln 1 housing, with the heat-insulating air gap 12 communicating with the atmosphere to cool the heat insulation ring 11 and the corresponding rotary kiln 1 housing, the elbow ends of the heat exchange tubes 2 penetrate through the rotary kiln 1 housing to be connected to the heat insulation ring 11, and the hot air hood 3 and the insulation ring 11 form, in combination, a hot air distribution chamber 16.

The heat exchange tubes 2 are made of a heat-resistant steel, and preferably, the heat-resistant steel is OCr25Ni20.

A fireproof material is provided on an inner side of a hot air distribution chamber 16 formed by combination of the hot air hood 3 and the heat insulation ring 11.

The heat exchange tube 2 is arranged in a path directly from the hot air hood 3 to the material feed end 7 of the rotary kiln 1.

The hot air hoods 3 are two in number, and supply heat to the rotary kiln by sections.

The rotary kiln 1 is provided with a plurality of material temperature detection means 14 and a plurality of heat-exchange-tube temperature detection means 15, wherein through feedback of the plurality of material temperature detection means 14 or the plurality of heat-exchange-tube temperature detection means 15, combustion in the high-temperature gas input mechanism or the rotational speed of the rotary kiln can be controlled, thereby effectively controlling the temperature within the rotary kiln, such that it conforms to the temperature required by the process.

As shown in FIG. 5, the heat exchange tube brackets 17 for supporting the heat exchange tubes are provided with through holes 21. Each through hole 21 is used for allowing a respective heat exchange tube 2 to pass therethough, wherein each heat exchange tube 2 is in clearance fit with its corresponding through hole 21, with the clearance having a length of 2-5 mm in the diameter direction of the rotary kiln. The multiple heat exchange tube brackets 17 are provided in a staggered manner, i.e. the multiple heat exchange tube brackets 17 are not on the same plane when viewed from a section.

Embodiment IV

Figure 4:
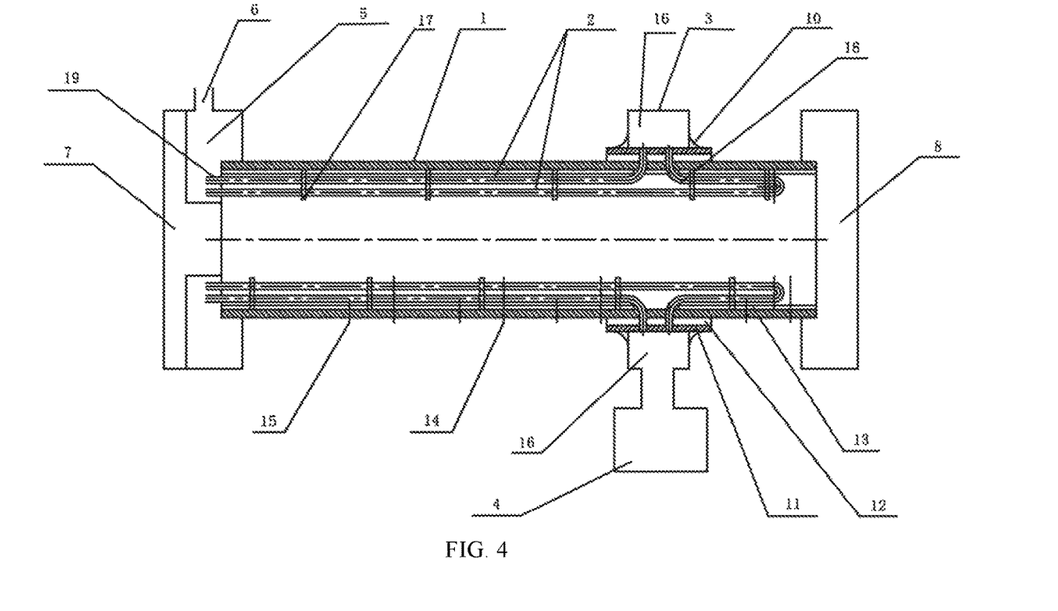
FIG. 4 is a structural schematic diagram of another material heating device of an embodiment of the present disclosure, in which the hot air hood and the heat insulation ring form, in combination, a hot air distribution chamber, some of the heat exchange tubes are arranged in a path directly from the hot air hood to the material feed end of the rotary kiln, and the other heat exchange tubes are arranged in a path which goes firstly towards the material discharge end and then turns 180 degrees to go towards the material feed end.

FIG. 4 shows a material heating device, comprising a rotary kiln 1, a plurality of heat exchange tubes 2, a hot air hood 3, a high-temperature gas input mechanism 4, an exhaust gas collecting chamber 5 and an exhaust gas output pipeline 6. The rotary kiln is provided with a material feed end 7 and a material discharge end 8. The plurality of heat exchange tubes 2 are provided in the rotary kiln 1 and uniformly distributed in the circumferential direction. Material channels are formed between the plurality of heat exchange tubes 2 and the inner cavity of the rotary kiln 2. The hot air hood 3 is provided at the periphery of a rotary kiln 1 housing. An air inlet end of each of the plurality of heat exchange tube 2 is in communication with the hot air hood 3. Each heat exchange tube 2 is connected with the hot air hood 3 through an elbow 18, with the elbow being a part of the heat exchange tube 2. An air outlet end 19 of each heat exchange tube 2 is in communication with the exhaust gas collecting chamber 5. The exhaust gas collecting chamber 5 is in communication with the exhaust gas output pipeline 6. The exhaust gas collecting chamber 5 is provided at the material feed end 7 of the rotary kiln 1. The hot air hood 3 is in communication with the high-temperature gas input mechanism 4. A sealing mechanism 10 is provided at an outer side of a portion of the hot air hood 3 where the hot air hood is connected with the rotary kiln 1 housing, multiple independent heat exchange tube brackets 17 for supporting the heat exchange tube are provided on the inner wall 20 of the rotary kiln, a heat insulation layer 13 is provided on the inner surface of the rotary kiln 1 housing, wherein the heat insulation layer 13 is located between the inner wall 20 of the rotary kiln and the plurality of heat exchange tubes.

A heat insulation ring 11 is provided on the outer side of the rotary kiln 1 housing, a heat-insulating air gap 12 is provided between the heat insulation ring 11 and the rotary kiln 1 housing, with the heat-insulating air gap 12 communicating with the atmosphere to cool the heat insulation ring 11 and the corresponding rotary kiln 1 housing, the elbow ends of the heat exchange tubes 2 penetrate through the rotary kiln 1 housing to be connected to the heat insulation ring 11, and the hot air hood 3 and the heat insulation ring 11 form, in combination, a hot air distribution chamber 16.

The heat exchange tubes 2 are made of a heat-resistant steel, and preferably, the heat-resistant steel is OCr25Ni20.

A fireproof material is provided on an inner side of a hot air distribution chamber 16 formed by combination of the hot air hood 3 and the heat insulation ring 11.

Some of the heat exchange tubes 2 are arranged in a path directly from the hot air hood 3 to the material feed end 7 of the rotary kiln 1, and the other heat exchange tubes 2 are arranged in a path which goes firstly towards the discharge end 8 and then turns 180 degrees to go towards the material feed end 7.

The rotary kiln is provided with a plurality of material temperature detection means 14 and a plurality of heat-exchange-tube temperature detection means 15, wherein through feedback of the plurality of material temperature detection means 14 and the plurality of heat-exchange-tube temperature detection means 15, combustion in the high-temperature gas input mechanism and the rotational speed of the rotary kiln can be controlled, thereby effectively controlling the temperature within the rotary kiln, such that it conforms to the temperature required by the process.

As shown in FIG. 5, the heat exchange tube brackets 17 for supporting the heat exchange tubes are provided with through holes 21. Each through hole 21 is used for allowing a respective heat exchange tube 2 to pass therethough, wherein each heat exchange tube 2 is in clearance fit with its corresponding through hole 21, with the clearance having a length of 2-5 mm in the diameter direction of the rotary kiln. The multiple heat exchange tube brackets 17 are provided in a staggered manner, i.e. the multiple heat exchange tube brackets 17 are not on the same plane when viewed from a section.

The advantageous effects of the present disclosure include, for example:

(1) The hot air hood is provided at the periphery of the rotary kiln housing and serves the function of distributing the heating gas, in the rotating process of the rotary kiln. The amounts of heat distributed to the heat exchange tubes connected with the hot air hood are substantially identical. The heat exchange between the heat exchange tubes and the material is accordingly uniform. The degrees of coal pyrolysis at the corresponding sections along the axis of the rotary kiln are consistent. The interior and the exterior of the heat exchange tube are two separate systems. Therefore, the coal gas produced by pyrolysis does not contain the exhaust gas generated by heating, then the coal gas has a relatively high heat value and a high utility value, and will not be burnt off in vain, which can achieve energy saving and emission reduction.

Also, some problems are avoided, for example, the defects in the coal separating apparatus with multiple combustors and parent-son pipes in the prior art are avoided, i.e., since the heat dissipation mechanisms and the heating mechanisms are both arranged in the rotary kiln, some heating mechanisms can heat normally, but some cannot heat normally. This further causes the heat dissipation mechanisms, which are supposed to preheat the materials, to absorb heat from the materials due to that some heating mechanisms cannot heat normally, as a result, the effective utilization rate of the apparatus is significantly decreased, the heat dissipation pipes do not expand and contract equally, the thermal stress inside the apparatus is large, and the service life of the apparatus is reduced. The heat-insulating insulation layer is provided on the inner wall of the rotary kiln, which enables the rotary kiln to have high utilization rate of thermal efficiency and the rotary kiln housing to have a low temperature, making the rotary kiln safe and reliable.

(2) The hot air hood does not generate heat directly, instead, heat in the hot air hood is transferred thereto from the high-temperature gas input mechanism which generates heat through combustion, the high-temperature gas input mechanism is located outside the kiln, making the combustion condition thereof easily observed. And it is relatively easy to overhaul and maintain the high-temperature gas input mechanism, which avoids technical problems, for example, in coal separating apparatus with multiple combustors and parent-son pipes in the prior art, that the combustion condition cannot be easily observed and the apparatus is difficult to overhaul and maintain. Moreover, gaseous, liquid and solid combustible mediums, such as pulverized coal, can all be used in the high-temperature gas input mechanism.

(3) The functions of the elbow connecting the heat exchange tube with the hot air hood:

1. the heat exchange tube and the hot air hood cannot be connected directly, but can be successfully connected through the elbow, thus the heat exchange tubes of various shapes can be flexibly used, achieving more flexible structure design; and 2. through the elbow, the high-temperature gas can smoothly make a 90-degree turning, enabling more smooth gas flowing, and the 90-degree elbow is easy to realize processing and field construction with a 90-degree phase difference.

(4) The purpose of providing a heat insulation layer is to minimize transferring of heat to the kiln housing from the rotary kiln, so as to reduce heat loss, and the purpose of not providing a heat insulation layer at a local portion of the inner wall of the rotary kiln where air inlet elbow ends of the heat exchange tubes are connected with the rotary kiln housing is to make the heat transferred from the hot air distribution chamber to the rotary kiln housing subjected to heat exchange between the materials and the housing as soon as possible to cool down the portion of the rotary kiln housing where the hot air distribution chamber is located, so as to increase the strength of the rotary kiln housing at this position.

(5) The functions of providing a heat insulation ring on the rotary kiln housing are as follows: by providing the heat insulation ring, the heat of the hot air hood cannot be directly transferred to the kiln housing, and the portion of the kiln housing where the insulation ring is located is cooled by air or water brought by the gap formed between the heat insulation ring and the kiln housing, which reduces the temperature of the portion of the kiln housing and reduces the strength reduction effect of high temperature on the kiln housing.

(6) The use of OCr25Ni20 heat-resistant steel for the heat exchange tube serves to impart a longer service life to the heat exchange system.

(7) The purpose of providing a fireproof material on the inner side of the hot air distribution chamber formed by the hot air hood and the rotary kiln housing or by the hot air hood and the heat insulation ring is to reduce heat loss and simultaneously protect the hot air hood, the rotary kiln housing and the heat insulation ring.

(8) The arrangement that the heat exchange tubes are arranged in a path which goes firstly towards the material discharge end and then turns 180 degrees to go towards the material feed end is of important significance on the following three aspects: 1. facilitating temperature distribution characteristic, of coal pyrolyzing at the rotary position, with relatively uniform temperatures, rapid coal pyrolysis and highest oil yield; 2. adjusting the position where the hot air hood is located to avoid the position of a roller; and 3. greatly increasing through such configuration the heat exchange area, increasing the length of the path for heat exchange, moreover, avoiding the phenomenon of poor heat exchange effect of materials at portions where the heat exchange tubes are arranged densely and thus achieving uniform heat exchange inside the whole rotary kiln and further better heat exchange effect.

(9) Providing two or three hot air hoods can realize heating the rotary kiln by sections and controlling the temperature of the rotary kiln by sections.

(10) The rotary kiln is provided with a plurality of material temperature detection means and a plurality of heat-exchange-tube temperature detection means, and through feedback of the plurality of material temperature detection and/or the plurality of heat-exchange-tube temperature detection, combustion of the high-temperature gas input mechanism and/or the rotational speed of the rotary kiln can be controlled, thereby effectively controlling the temperature within the rotary kiln such that it conforms to the temperature required by the process.

(11) The confirmation of providing multiple independent heat exchange tube brackets connected with the inner wall of the rotary kiln and making the multiple heat exchange tubes arranged in a staggered manner and not located at the same plane when viewed from a section enables that the flowing of the material in a axial direction of the rotary kiln is not hindered, such that the material can smoothly flows in the rotary kiln along the axis of the rotary kiln, and the phenomenon of poor heat exchange effect and larger temperature difference at local portions caused by retention of the material at these portions.

The above description merely illustrates some embodiments of the present disclosure, which are not intended to limit the present disclosure. For a person skilled in the art, various variations, substitutions and modifications may be made to the heating device of the present disclosure according to needs. Any modifications, equivalent substitutions, improvements and so on made within the spirit and principle of the present disclosure shall fall within the scope of the claims of the present disclosure.

The invention claimed is:

1. A material heating device, comprising a rotary kiln, a plurality of heat exchange tubes, a hot air hood, a high-temperature gas input mechanism, an exhaust gas collecting chamber and an exhaust gas output pipeline, the rotary kiln being provided with a material feed end and a material discharge end, wherein the plurality of heat exchange tubes are provided in the rotary kiln, uniformly distributed in a circumferential direction, parallel to an axis of the rotary kiln and adjacent to an inner wall of the rotary kiln, heat exchange tube brackets configured for supporting the plurality of heat exchange tubes are provided on the inner wall of the rotary kiln, a heat insulation layer is provided on the inner wall of the rotary kiln, a space inside the rotary kiln, except for the plurality of heat exchange tubes and the heat exchange tube brackets, is used as a material channel, the hot air hood is provided at a periphery of a rotary kiln housing, an air inlet end of each heat exchange tube is in communication with the hot air hood, each heat exchange tube is connected with the hot air hood through an elbow, with each elbow being a part of a respective heat exchange tube of the plurality of heat exchange tubes, an air inlet elbow end of each heat exchange tube is connected with the rotary kiln housing, the hot air hood and the rotary kiln housing form, in combination, a hot air distribution chamber, an air outlet end of each heat exchange tube is in communication with the exhaust gas collecting chamber that is in communication with the exhaust gas output pipeline, the exhaust gas collecting chamber is provided at the material feed end of the rotary kiln, the hot air hood is in communication with the high-temperature gas input mechanism, a sealing mechanism is provided at an outer side of a portion of the hot air hood where the hot air hood is connected with the rotary kiln housing, the hot air hood is located in a middle of the rotary kiln and is closer to the material discharge end than the material feed end, some of the plurality of heat exchange tubes are arranged in a path directly from the hot air hood to the material feed end of the rotary kiln, the rest of the plurality of heat exchange tubes are arranged in a path which goes from the hot air hood firstly towards the material discharge end and then turns 180 degrees to go towards the material feed end, and the heat exchange tube brackets are provided in a staggered manner in an axial direction of the rotary kiln and provided with through holes, and each heat exchange tube is in clearance fit with a respective through hole.

2. The material heating device according to claim 1, wherein a heat insulation layer is provided on the inner wall of the rotary kiln, wherein no heat insulation layer is provided at a local portion of the inner wall of the rotary kiln where the air inlet elbow ends of the heat exchange tubes are connected with the rotary kiln housing.

3. The material heating device according to claim 2, wherein a heat insulation ring is provided on an outer side of the rotary kiln housing, a heat-insulating air gap is formed between the heat insulation ring and the rotary kiln housing, with the air gap communicating with atmosphere to cool the heat insulation ring and a corresponding portion of the rotary kiln housing, an elbow end of each heat exchange tube penetrates through the rotary kiln housing to be connected to the heat insulation ring, the hot air hood and the heat insulation ring form, in combination, the hot air distribution chamber, and a fireproof material layer is provided on an inner side of the hot air distribution chamber formed by combination of the hot air hood and the heat insulation ring.

4. The material heating device according to claim 1, wherein the heat exchange tubes are made of a heat-resistant steel.

5. The material heating device according to claim 4, wherein the heat-resistant steel is 0Cr25Ni20.

6. The material heating device according to claim 1, wherein the high-temperature gas input mechanism is provided outside the rotary kiln, and heat generated by combustion in the high-temperature gas input mechanism is transferred to the hot air hood.

7. The material heating device according to claim 1, wherein a combustible medium used in the high-temperature gas input mechanism is gaseous, liquid or solid.

8. The material heating device according to claim 1, wherein a combustible medium used in the high-temperature gas input mechanism is pulverized coal.

9. The material heating device according to claim 1, wherein one hot air hood and one high-temperature gas input mechanism together comprise a hot air hood and high-temperature gas input mechanism set, and one, two or three hot air hood and high-temperature gas input mechanism sets are provided.

10. The material heating device according to claim 1, wherein the rotary kiln is provided with a plurality of material temperature detection means and a plurality of heat-exchange-tube temperature detection means, wherein through feedback of the plurality of material temperature detection means and/or the plurality of heat-exchange-tube temperature detection means, combustion of the high-temperature gas input mechanism and/or a rotational speed of the rotary kiln are controlled, thereby effectively controlling a temperature within the rotary kiln.

11. The material heating device according to claim 2, wherein the rotary kiln is provided with a plurality of material temperature detection means and a plurality of heat-exchange-tube temperature detection means, wherein through feedback of the plurality of material temperature detection means and/or the plurality of heat-exchange-tube temperature detection means, combustion of the high-temperature gas input mechanism and/or a rotational speed of the rotary kiln are controlled, thereby effectively controlling a temperature within the rotary kiln.

12. The material heating device according to claim 3, wherein the rotary kiln is provided with a plurality of material temperature detection means and a plurality of heat-exchange-tube temperature detection means, wherein through feedback of the plurality of material temperature detection means and/or the plurality of heat-exchange-tube temperature detection means, combustion of the high-temperature gas input mechanism and/or a rotational speed of the rotary kiln are controlled, thereby effectively controlling a temperature within the rotary kiln.

13. The material heating device according to claim 4, wherein the rotary kiln is provided with a plurality of material temperature detection means and a plurality of heat-exchange-tube temperature detection means, wherein through feedback of the plurality of material temperature detection means and/or the plurality of heat-exchange-tube temperature detection means, combustion of the high-temperature gas input mechanism and/or a rotational speed of the rotary kiln are controlled, thereby effectively controlling a temperature within the rotary kiln.

14. The material heating device according to claim 5, wherein the rotary kiln is provided with a plurality of material temperature detection means and a plurality of heat-exchange-tube temperature detection means, wherein through feedback of the plurality of material temperature detection means and/or the plurality of heat-exchange-tube temperature detection means, combustion of the high-temperature gas input mechanism and/or a rotational speed of the rotary kiln are controlled, thereby effectively controlling a temperature within the rotary kiln.

15. The material heating device according to claim 6, wherein the rotary kiln is provided with a plurality of material temperature detection means and a plurality of heat-exchange-tube temperature detection means, wherein through feedback of the plurality of material temperature detection means and/or the plurality of heat-exchange-tube temperature detection means, combustion of the high-temperature gas input mechanism and/or a rotational speed of the rotary kiln are controlled, thereby effectively controlling a temperature within the rotary kiln.

16. The material heating device according to claim 7, wherein the rotary kiln is provided with a plurality of material temperature detection means and a plurality of heat-exchange-tube temperature detection means, wherein through feedback of the plurality of material temperature detection means and/or the plurality of heat-exchange-tube temperature detection means, combustion of the high-temperature gas input mechanism and/or a rotational speed of the rotary kiln are controlled, thereby effectively controlling a temperature within the rotary kiln.

17. The material heating device according to claim 8, wherein the rotary kiln is provided with a plurality of material temperature detection means and a plurality of heat-exchange-tube temperature detection means, wherein through feedback of the plurality of material temperature detection means and/or the plurality of heat-exchange-tube temperature detection means, combustion of the high-temperature gas input mechanism and/or a rotational speed of the rotary kiln are controlled, thereby effectively controlling a temperature within the rotary kiln.

18. The material heating device according to claim 9, wherein the rotary kiln is provided with a plurality of material temperature detection means and a plurality of heat-exchange-tube temperature detection means, wherein through feedback of the plurality of material temperature detection means and/or the plurality of heat-exchange-tube temperature detection means, combustion of the high-temperature gas input mechanism and/or a rotational speed of the rotary kiln are controlled, thereby effectively controlling a temperature within the rotary kiln.

* * * * *